(12) United States Patent
Conner et al.

(10) Patent No.: US 7,627,214 B2
(45) Date of Patent: Dec. 1, 2009

(54) ADJUSTABLE OPTICAL TAP

(75) Inventors: Mark E. Conner, Granite Falls, NC (US); David R. Kozischek, Hickory, NC (US); Frances D. Carter, Catonsville, MD (US); Daniel A. Nolan, Corning, NY (US); William J. Miller, Horseheads, NY (US); William T. Sawyer, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/069,213

(22) Filed: Feb. 8, 2008

(65) Prior Publication Data

US 2009/0202205 A1 Aug. 13, 2009

(51) Int. Cl.
*G02B 6/26* (2006.01)
(52) U.S. Cl. .............. 385/48; 385/15; 385/39
(58) Field of Classification Search ............ 385/15, 385/39, 48
See application file for complete search history.

(56) References Cited

U.S. PATENT DOCUMENTS

| | | | |
|---|---|---|---|
| 4,958,900 A | 9/1990 | Ortiz, Jr. ............... 350/96.18 |
| 5,050,949 A | 9/1991 | DiGiovanni et al. ........ 359/341 |
| 6,049,413 A | 4/2000 | Taylor et al. ................ 359/337 |
| 6,259,842 B1 * | 7/2001 | Giltner ........................ 385/48 |
| 6,441,944 B1 | 8/2002 | Kim et al. .................... 359/281 |
| 6,487,336 B1 | 11/2002 | Yao .............................. 385/24 |
| 6,628,870 B2 | 9/2003 | Yamaguchi ................. 385/123 |
| 6,650,458 B1 | 11/2003 | Prosyk et al. ............... 359/276 |
| 6,711,340 B2 | 3/2004 | Dickson ..................... 385/140 |
| 6,721,507 B2 | 4/2004 | Iwata et al. ................... 398/79 |
| 6,782,209 B2 | 8/2004 | Copeland et al. ........... 398/157 |
| 6,934,433 B2 | 8/2005 | Miyata et al. ................ 385/16 |
| 6,950,593 B2 * | 9/2005 | Hodge et al. ............... 385/135 |
| 7,362,925 B2 | 4/2008 | Miyata et al. ................ 385/14 |

* cited by examiner

*Primary Examiner*—Jennifer Doan
(74) *Attorney, Agent, or Firm*—C. Keith Montgomery

(57) ABSTRACT

An adjustable optical tap for adjusting input power, output power and drop power in a communications network includes an enclosure having a plurality of connector assemblies being configured for interconnecting input and output cables; a cover attachable to the enclosure, the cover including a plurality of drop cable ports; and a tunable splitter disposed in the enclosure in communication with the input cable and the drop cable ports, the tunable splitter being configured for adjustment to affect attenuation in a broad wavelength band.

21 Claims, 8 Drawing Sheets

$d_2 \sim .9\, d_1$

ADJUSTABLE OPTICAL TAP

FIELD OF THE INVENTION

The present invention is directed to an adjustable optical tap that allows for adjusting input power, output power and drop power in a communications network.

BACKGROUND OF THE INVENTION

Optical fiber is used for a variety of broadband applications including voice, video and data transmissions. As a result of the ever-increasing demand for broadband communications, fiber optic networks typically include a large number of mid-span access locations at which one or more optical fibers are branched from a distribution cable. These mid-span access locations provide a branch point from the distribution cable leading to an end-user or subscriber. Thus, "all optical" communications networks have been extended to the subscriber in arrangements known as "fiber-to-the-premises" (FTTP). Due to the geographical spacing between the service provider and the various subscribers served by each mid-span access location, optical connection terminals, such as closures, network terminals, pedestals and the like, are needed for interconnecting optical fibers and drops extending from the subscribers and optical fibers of the distribution cable extending from the service provider to establish the optical connection necessary to complete the FTTP communications network.

In one example of a fiber optic communications network, one or more drop cables are interconnected with a distribution cable at a mid-span access location within an aerial splice closure suspended from the distribution cable. To configure the optical connections within the closure in the field, a technician enters the closure, identifies an optical fiber of the distribution cable and interconnects the optical fiber with an optical fiber of a particular drop cable. The optical fibers of the drop cables are typically joined directly to the optical fibers of the distribution cable at the mid-span access location using conventional splicing techniques, such as fusion splicing. In other instances, the optical fibers of the drop cables and the optical cables of the distribution cable are first spliced to a short length of optical fiber having an optical connector mounted upon the other end, referred to in the art as a "pigtail." The pigtail is routed to an opposite side of a connector adaptor sleeve to interconnect the drop cable within the distribution cable. In either of the foregoing cases, the process of entering and configuring the connections is not only time consuming, but frequently must be accomplished by a highly skilled field technician at significant cost and under field working conditions that may be less than ideal.

In order to reduce costs by permitting less experienced and less skilled technicians to perform mid-span access optical connections and reconfigurations in the field, communications service providers increasingly are pre-engineering new fiber optic networks and demanding factory prepared interconnection solutions, commonly referred to as "plug-and-play" type systems. However, even with arduous pre-engineering, it may be inconvenient, hazardous, or even impossible to make subsequent interconnections between pre-terminated or pre-connectorized optical fibers of the distribution cable and the optical fibers of the drop cables. Moreover, since the common practice is to use standard splitters; i.e., non-adjustable splitters, and hardware at different site locations, quick connection reconfigurations are not possible without completely disabling the communications system. Additionally, the optical power in the conventional connections cannot be adjusted over input, output, and drop segments to provide a broader wavelength band above the conventional 40 nm wavelength band while attempting to affect lower attenuation levels.

Although coaxial ("coax") cable devices are known that distribute power to a predetermined number of coax cables, these devices are designed specifically for the coax cable industry and offer no solution for problems facing the optical fiber industry. More specifically, the coax cable devices use active electronics to tap desired power and utilize face plates based on this desired amount of power to be tapped and the number of drops. In other words, the face plate determines the power to be tapped, and the coax tapped power cannot be adjusted in the field.

An integrated fiber optic connection solution that is sufficiently rugged for deployment in harsh field environments, whether indoors, outdoors, and/or above or below grade level, is needed in the industry, which allows for passive power adjustment in the field between input, output, and drop legs of a fiber optic connection. Moreover, the desired solution would include an interchangeable plate that would permit converting easily from one tap ratio to another—such as from 1×4 to 1×16 taps—without requiring field splicing.

BRIEF SUMMARY OF THE INVENTION

The present invention provides various embodiments of an adjustable optical tap for readily interconnecting optical fibers of one or more pre-connectorized fiber optic drop cables with respective optical fibers of a fiber optic distribution cable at a branch point in a fiber optic communications network. In various embodiments, the adjustable optical tap is configured to receive one or more pre-connectorized drop cables extending from an outside plant connection terminal, such as an aerial closure, a below grade closure, an aboveground closure, a network terminal, a pedestal or a Network Interface Device (NID), to permit a relatively unskilled field technician to readily connect, disconnect, or reconfigure optical fibers of the drop cables with respective optical fibers of a distribution cable. In particular embodiments, the adjustable optical tap is configured to tune or adjust power between input, output and drop legs of the optical tap. In other embodiments, a plate or covering of the optical tap may be interchanged with a plate having a different number of optical taps or ports, such as 1×4, 1×8, 1×32 and the like.

By way of example, according to one embodiment of the invention, an adjustable optical tap for adjusting input power, output power, and drop power in a communications network includes an enclosure having a plurality of connector assemblies being configured for interconnecting input and output cables; a cover attachable to the enclosure, the cover including a plurality of drop cable ports; and a tunable splitter disposed in the enclosure in communication with the input cable and the drop cable ports, the tunable splitter being configured for an in-the-field adjustment to affect attenuation in a broad wavelength band. In this embodiment, the connector assemblies may include at least two pre-connectorized assemblies being configured respectively for connections of the input cable and the output cable.

Also in this embodiment, the cover may be a first cover that is interchangeable with a second cover. The second cover may have a different number of drop cable ports than the first cover.

Further, in this embodiment of the disclosure, the broad wavelength band is between about 40 nm to at least about 300 nm. An adjustment device may be connected to the enclosure to adjust the tunable splitter, and a fixed splitter may be located between the tunable splitter and the drop cable ports.

In another embodiment of the invention, an adjustable optical tap for adjusting input power, output power, and drop power in a communications network may include an enclosure having a plurality of connector assemblies being configured for interconnecting input and output cables; a cover attachable to the enclosure, the cover including a plurality of drop cable ports; a tunable splitter disposed in the enclosure in communication with the input cable and the drop cable ports, the tunable splitter being configured for an in-the-field adjustment to affect attenuation in a broad wavelength band; and an adjustment device connected to the enclosure, the adjustment device being configured to adjust the tunable splitter.

In a further embodiment, a method of adjusting input power, output power and drop power using an adjustable optical tap in a communications network includes installing an enclosure in a fiber optic communications network, the enclosure having an input connector assembly and an output connector assembly; attaching an interchangeable cover to the enclosure, the interchangeable cover including a plurality of drop cable ports; connecting an input cable to the input connector assembly; selecting a power split to affect attenuation in a broad wavelength band; and setting the power split between the input cable and the drop cable ports in a field setting. The interchangeable cover may be replaceable with another cover, which may have the same or a different number of drop cable ports than the first cover, and an output cable may be connected to the output connector assembly. Also, respective drop cables may be connected to the drop cable ports.

In this embodiment, a broad wavelength band may be about 40 nm to at least about 300 nm, and the power split may increase a loss budget by at least about 2.8 dB. The power split may be effected by adjusting a tunable splitter interposed between the input cable and the drop cable ports. The tunable splitter may be adjusted by an external adjustment device connected to the enclosure, the setting of the power split being accomplished without opening the enclosure.

The various components and elements of the adjustable optical tap embodiments and their equivalents are simple to manufacture, install and use. Other advantages of the various embodiments and equivalents according to the invention will be apparent from the following description and the attached drawings, or can be learned through practice of the embodiments and their equivalents.

BRIEF DESCRIPTION OF THE DRAWINGS

A full and enabling disclosure, including the best mode thereof to one skilled in the art, is set forth more particularly in the remainder of the specification, including reference to the accompanying figures, in which.

DETAILED DESCRIPTION OF THE INVENTION

Figure 1:
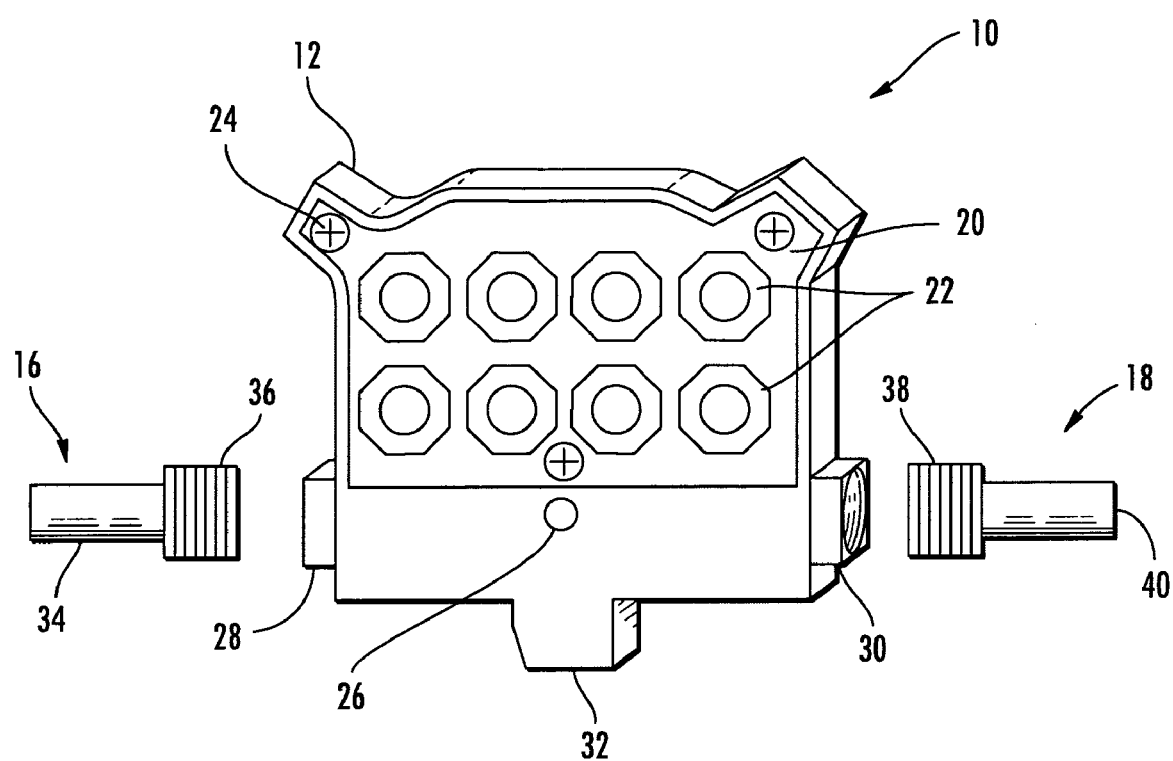
FIG. 1 is an elevational view of an adjustable optical tap according to one embodiment of the invention.

Detailed reference will now be made to the drawings in which examples of the present invention are shown. The detailed description uses numerical and letter designations to refer to features of the drawings. Like or similar designations in the drawings and description have been used to refer to like or similar parts of the disclosure where possible.

The drawings and detailed description provide a full and written description of the examples of the invention, and of the manner and process of making and using these examples, so as enable one skilled in the pertinent art to make and use them, as well as the best mode of carrying out the invention. The examples set forth in the drawings and detailed description are provided by way of explanation only and are not meant as limitations of the invention. The present invention thus includes any modifications and variations of the following examples as come within the scope of the appended claims and their equivalents.

The figures that are about to be described in detail show exemplary adjustable, passive optical devices or taps, which generally include an integrated hardware enclosure or body having a broadband adjustable or tunable splitter for interconnecting distribution and drop cables. The adjustable optical taps enable passive power adjustments for input, output and drop legs in the field. The enclosure of the adjustable optical tap may include pre-connectorized connectors for the input, output and drop legs. Additionally, a cover or plate, such as a front face plate, may be removed and exchanged with other plates having the same footprint. The other plates may have the same or a different number of drops as the original plate, such as 1×4, 1×8, 1×16, 1×32 and the like. Because the adjustable optical tap includes the adjustable splitter, a technician may adjust the power to optimum levels to affect attenuation without losing broadband as the technician approaches low attenuation levels. Moreover, the adjustable optical taps as described below, permit operating ranges from about 40 nm to about 1550 nm, for instance to at least about 300 nm. These and other advantages and benefits will be better understood from the following description and exemplary methods of operation.

Figure 2:
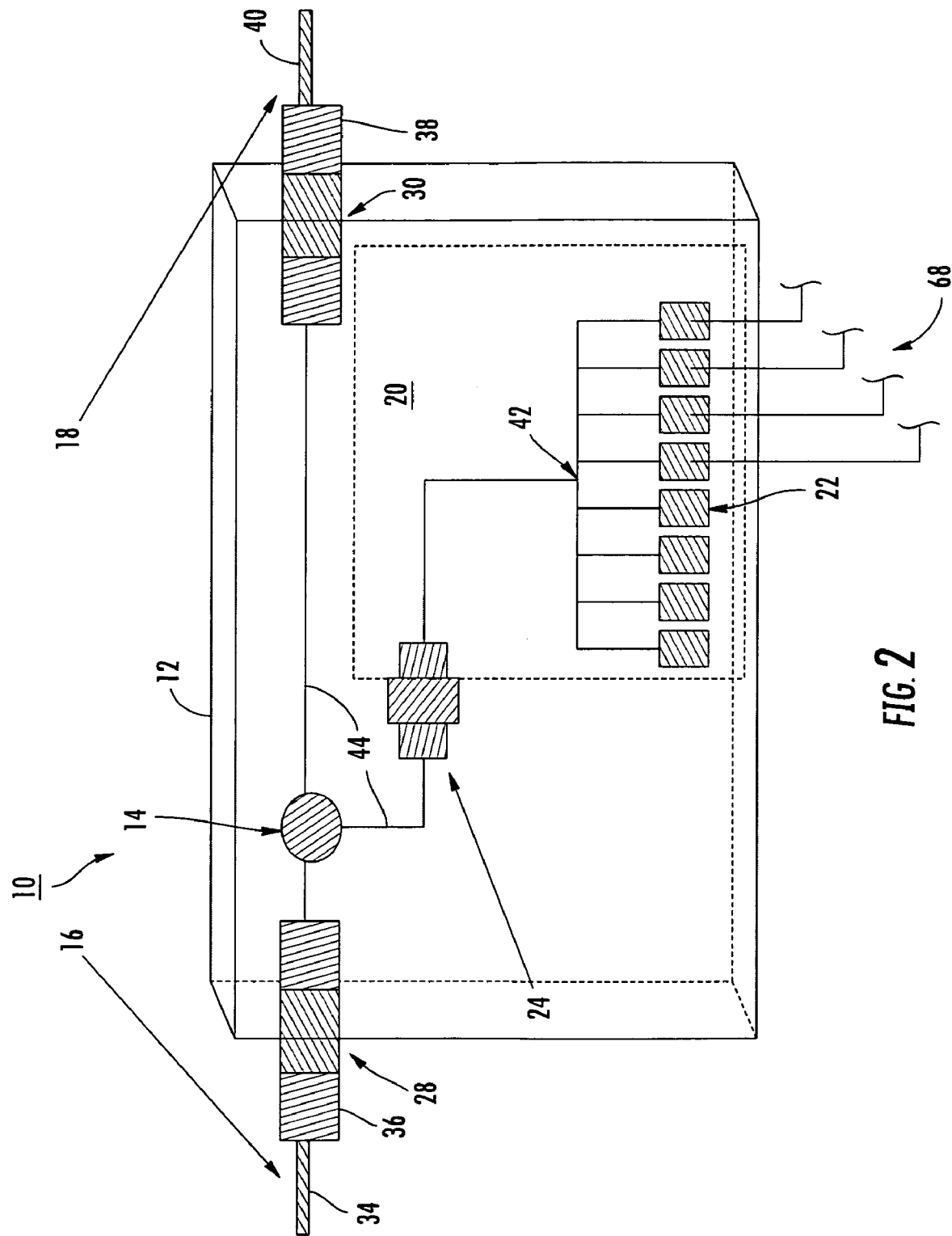
FIG. 2 is a schematic cross-sectional view of the adjustable optical tap as in FIG. 1.

With reference now to FIGS. 1 and 2, an adjustable optical tap according to one embodiment of the present invention is designated in general by the element number 10 and may include an integrated hardware body or enclosure 12, which contains a broadband, adjustable device 14, such as a tunable coupler or splitter, for adjusting input power, output power and drop power from the adjustable optical tap 10. Also, the enclosure 12 includes an installation base or projection 32 to position the adjustable optical tap 10 in a complementary receptacle (not shown). The skilled artisan will appreciate that the number and shape of the installation base 32, as well as the overall size and shape of the optical tap 10, may be modified to accommodate different receptacles or housings.

As shown in FIGS. 1 and 2, the adjustable optical tap 10 receives pre-connectorized input and output connector assemblies 16, 18. Suitable pre-connectorized assemblies 16, 18, such as OptiTap™ brand connectors, are available from Corning Cable Systems, LLC of Hickory, N.C. In this example, the adjustable optical tap 10 also includes connector adaptors 28, 30 to receive respective pre-connectorized connector assemblies 16, 18 as will be described in greater detail below.

Figure 8:
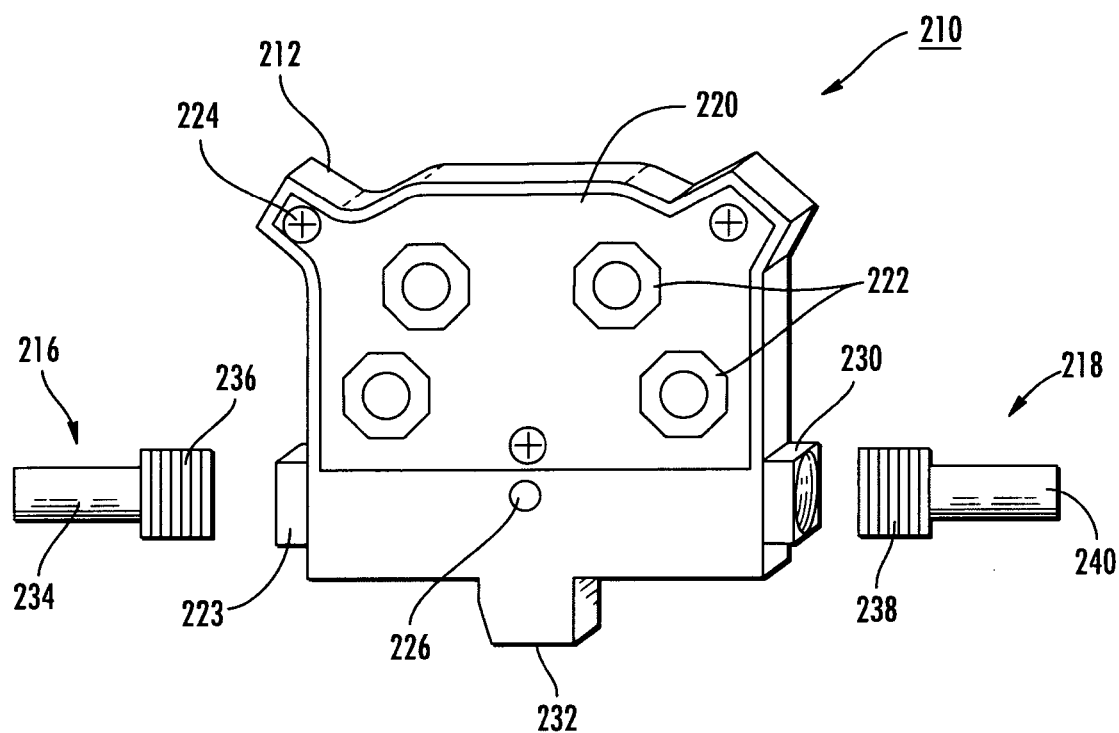
FIG. 8 is an elevational view of another adjustable optical tap according to another embodiment of the invention.

FIGS. 1 and 2 further show a replaceable face plate or cover 20, which in this example includes eight taps 22, also known as drops or drop ports, that are pre-connectorized. As shown, the replaceable face plate 20 may be removed by one or more screws or SC APC connections 24 to service the adjustable optical tap 10, or to replace the plate 20 with another plate having either the same or a different number of drops 22, such as a 1×4 tap as shown in FIG. 8 and described below. A power adjustment device 26, such as a knob, screw, button or the like, is also included on the enclosure 12, which in this example is shown below the face plate 20. However, the skilled artisan will understand that the shape of the enclosure 12, its plate 20 and the position of components such as the power adjustment device 26 are merely provided by way of examples and are not limited to that which is shown in the drawings.

As introduced above, the connector adaptors 28, 30 in FIGS. 1 and 2 are disposed on either side of the adjustable optical tap 10, but may be located elsewhere on the enclosure 12 and may include additional connector adaptors. The pre-connectorized input connector assembly 16, also briefly introduced above, includes an input distribution cable 34 that is connected to a pre-connectorized input connector 36 for attachment to the connector adaptor 28. Likewise, the pre-connectorized output connector assembly 18 includes an output distribution cable 38 that is connected to a pre-connectorized output connector 40, which in turn is connected to the output connector adaptor 30. As shown most clearly in FIG. 2, the input and output cables 34, 40 are connected to the adjustable splitter 14 by a series of optical fibers 44, which in turn are connected in this example to a standard or fixed splitter 42 to connect the cables 34, 40 to the drop ports 22 and more particularly, to a plurality of drop cables 68 that lead to subscriber homes or businesses.

Figure 3:
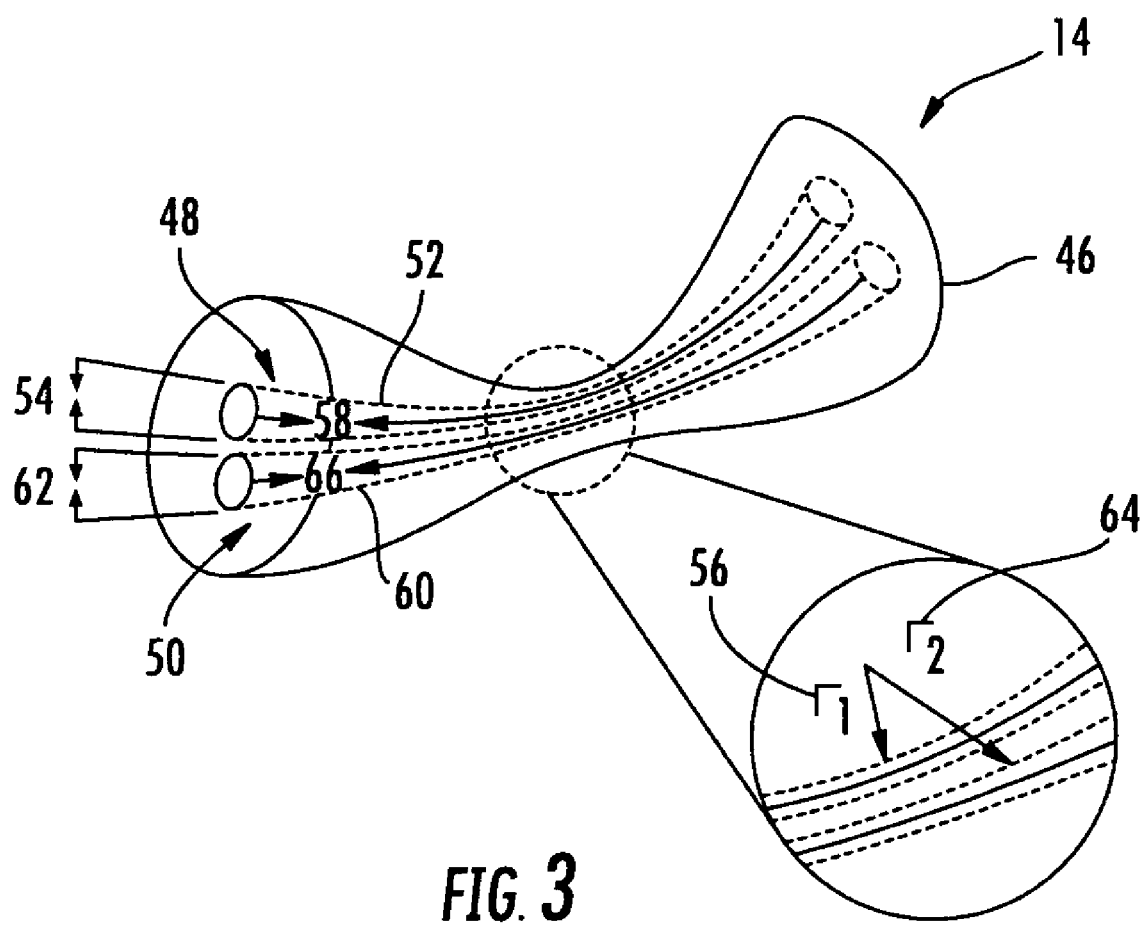
FIG. 3 is a schematic view of an adjustable splitter as may be used in the adjustable optical tap of FIG. 1.

Turning now to FIG. 3, the broadband adjustable splitter 14, briefly introduced above, is shown most clearly. In this example, the splitter 14 includes a casing or cover 46 in which a first fiber 48 and a second fiber 50 may be encapsulated or embedded. The casing 46 is a material, which has a different index than the two fibers 48, 50, and the two fibers 48, 50 may each have different claddings 52, 60 having different indices. As shown, the two fibers 48, 50 may be passively tuned, such as by bending to different degrees such as to first and second bend radii 56, 64. Different propagation constants result from this bending or tuning action as well as from the noted differences in the fibers 48, 50, such as the different cladding indices due to the different cladding 52, 60. Additionally, the embedded fibers 48, 50 may have different diameters, respectively 54, 62, and different lengths or other geometries, respectively 58, 66, that affect propagation constants.

Figure 4:
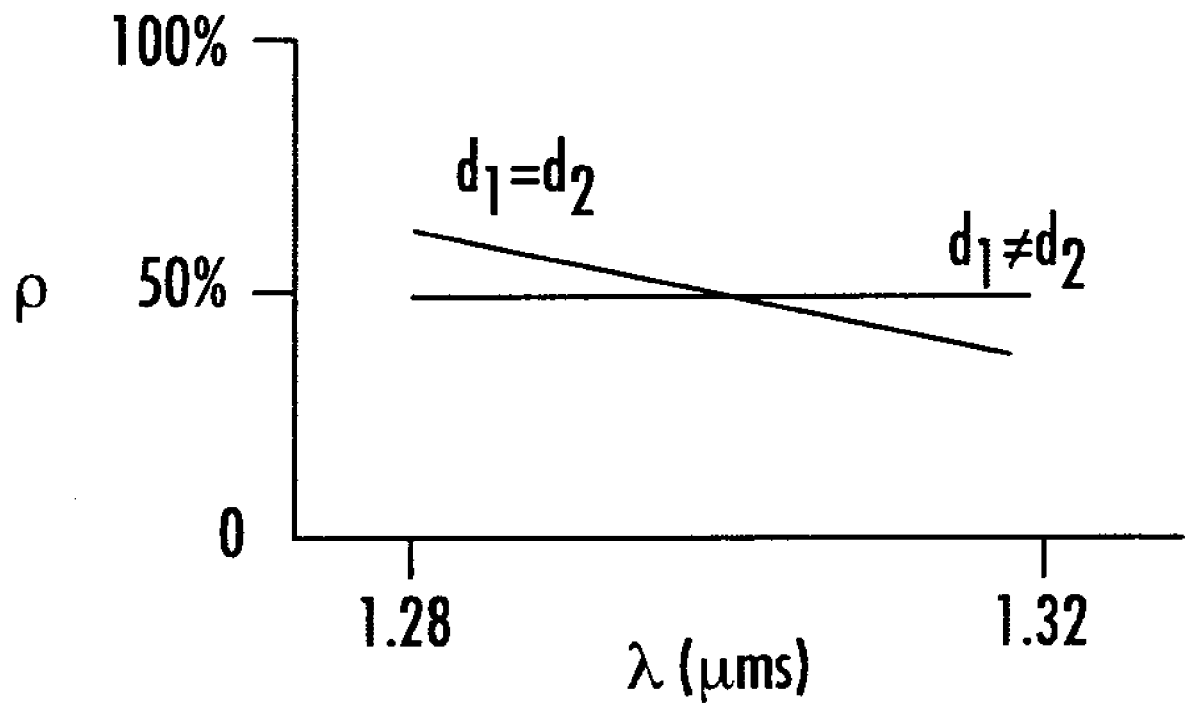
FIG. 4 is a chart showing achromatic or broadband coupling occurring when fibers are used in the splitter as in FIG. 3.
Figure 4:
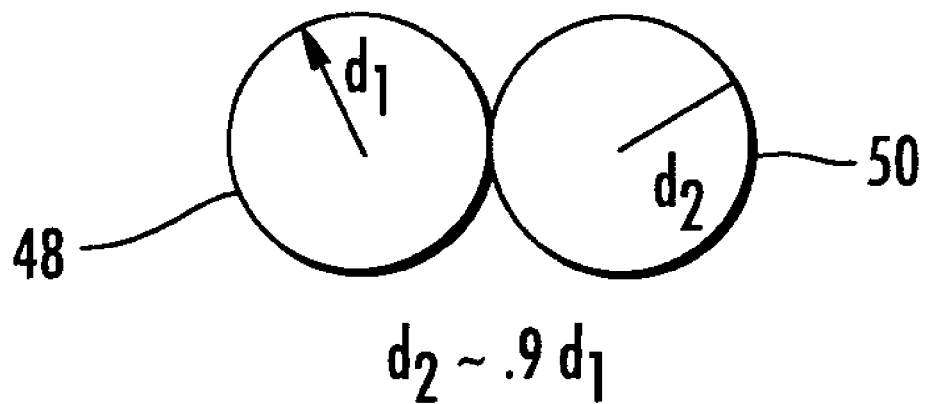

More particularly, by using the different fibers 48, 50 as shown in FIG. 4, a variable optical attenuator (VOA) having a dynamic range on the order of 0 dB to 20 dB over a 40 nm wavelength band to over about 300 nm has been discovered. As FIG. 4 shows, achromatic or broadband coupling occurs when the fibers 48, 50 differ, either in geometry or indices as noted above. Thus, the splitter 14 enhances coupling and is not limited to only one band such as the Erbium band. Moreover, the adjustable splitter 14 enjoys low insertion loss, low polarization dependent loss (PDL) and excellent dynamic range. As introduced above, the broadband adjustable splitter 14 is nearly ten times broader in wavelength capability than currently available multi-clad VOA's. Accordingly, the adjustable optical tap 10 has wide band application for fiber to the home, for example, and capable of accommodating wavelengths from 40 nm up to about 1310 nm to about 1550 nm.

Figure 5:
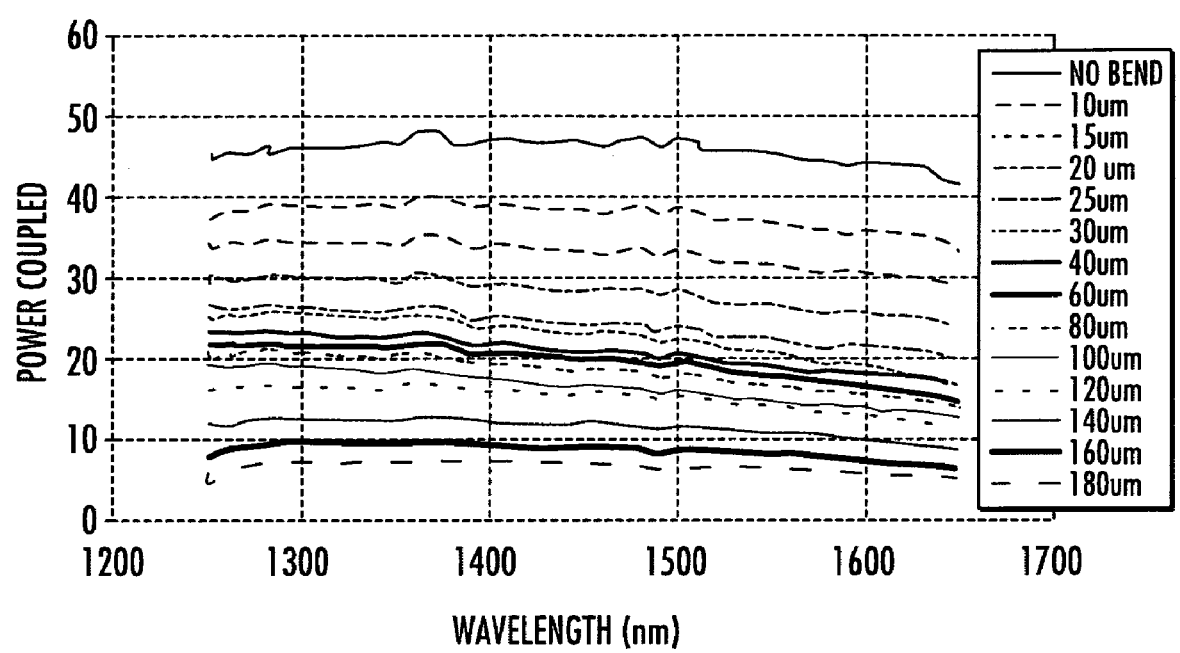
FIG. 5 is a chart showing power coupled as a function of bending the splitter as in FIG. 3 in a right-handed direction to various degrees.

FIG. 5 is an example of power being coupled as a function of bending the splitter 14 to various degrees in a right-handed direction. As shown, even a 120 μm bend to the right couples the power, rather than preventing coupling as was generally perceived in the art; i.e., before the present discovery those skilled in the art perceived that achromatic couplers would not work for broadband VOA. In contrast, however, as one bends the splitter 14 to affect attenuation, the broadband nature is not lost and may be enhanced as one approaches low attenuation levels.

Figure 6:
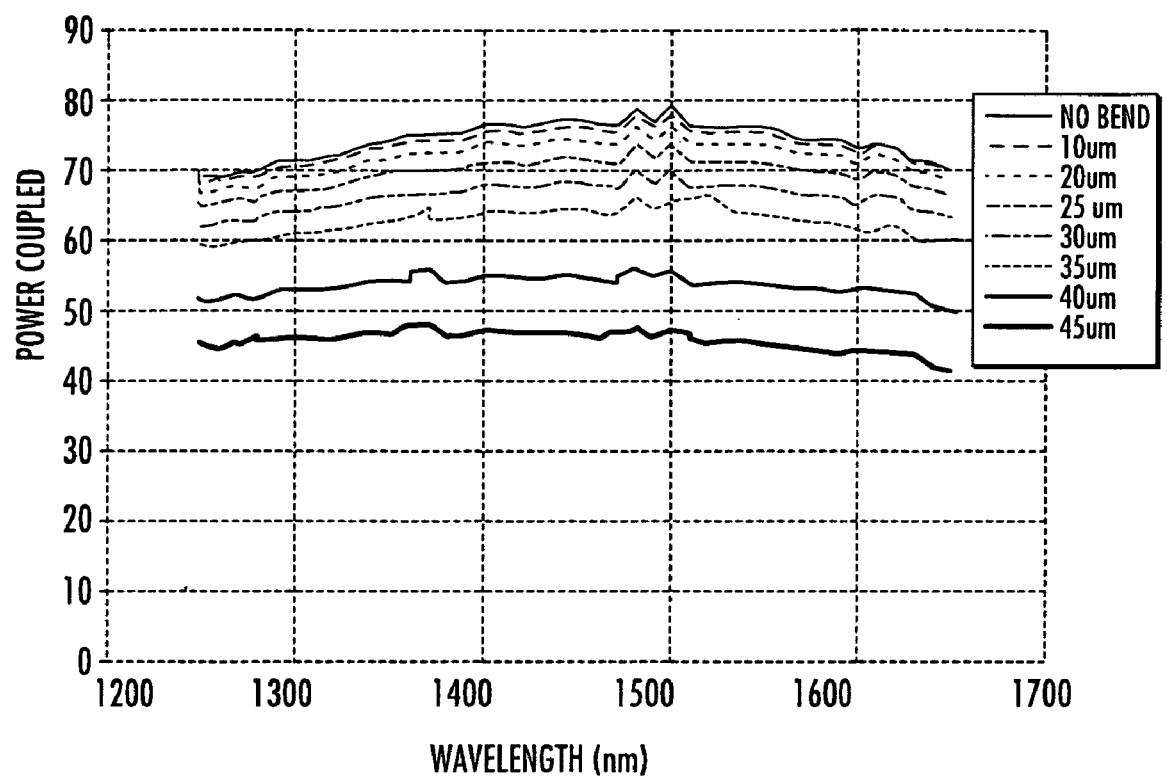
FIG. 6 is a chart showing power coupled as a function of bending the splitter as in FIG. 3 in a left direction to various degrees.

With reference to FIG. 6, the splitter 14 is shown being bent or coupled to various degrees, such as up to 45 μm, without losing broadband, and in fact, power is complemented and the operating range of the adjustable optical tap 10 is capable of over 300 nm, up to about 1550 nm.

As introduced above, particularly with respect to FIGS. 3-6, in order to achieve good achromaticity through all bending states, physical parameters of the couplers or splitters as described above should include cladding differences of the fibers 48, 50 on the order of 0.01 to 0.02%. A neck down ratio also has been found to be preferable on the order of 4:1 and a taper length of the fibers 48, 50 on the order of 1 cm. Longer taper lengths have been found to potentially introduce interferometric effects that introduce wavelength dependencies in an unbent state, which may become magnified in bent states.

Figure 7:
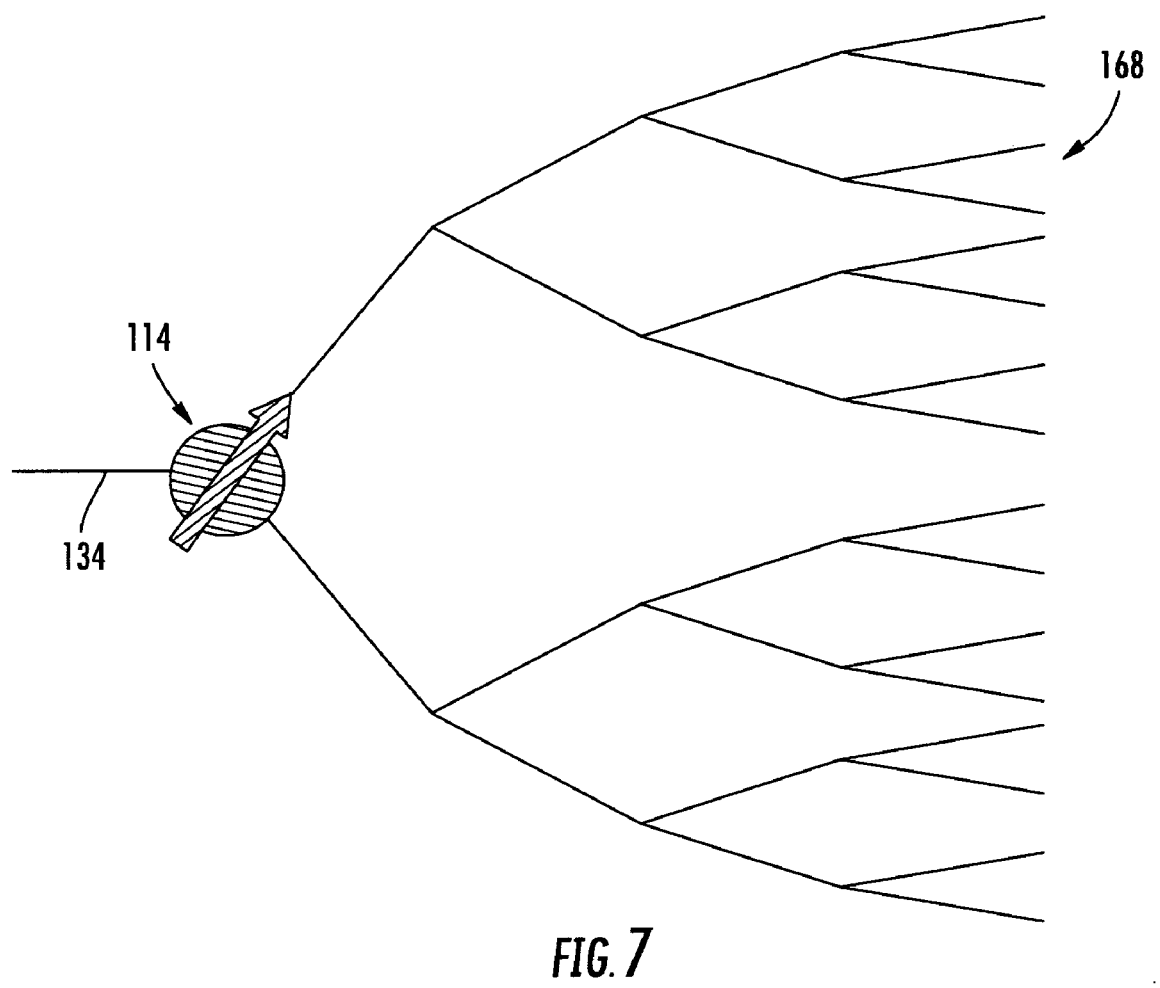
FIG. 7 is a schematic view of a splitter as in FIG. 3 being set to a minimum power split for a short-reach split.

Turning now to FIG. 7, one advantage of an embodiment according to the invention is that a broadband adjustable splitter or coupler 114 may be set to a minimum power split, for instance for a "short-reach split". As shown, a pre-connectorized input distribution cable 134 may be connected to the splitter 114, which is set in this case to optimize power input and power drops to 8 drop cables 168. As noted above, a face plate or cover similar to the plate 20 may be replaced with additional drop ports, such as a 32-way tap (1×32), based on future requirements. The splitter 114 may be adjusted in the field without opening the enclosure and without splicing in order to tune the power input, power output, and power drops to accommodate these additional drop ports and drop cables 168.

Another embodiment of an adjustable optical tap generally designated by the element number 210 is shown in FIG. 8. In some ways, the adjustable optical tap 210 is similar to the embodiments described above. Therefore, many components, aspects and materials of this embodiment are the same or similar to the foregoing components, aspects and materials.

FIG. 8 particularly shows a tap plate or cover 220 that is interchangeable from one ratio to another, such as from the 8-way tap plates 20 described above, to a 1×4 plate 220 shown here. For instance, the replaceable face plate 220 may be removed by one or more screws or SC APC connections 224 to service the adjustable optical tap 210, or to replace the plate 220 with another plate having either the same or a different number of drops 222. Again, no field splicing is required for this embodiment, which allows the technician to connect a pre-connectorized input connector assembly 216, including its input distribution cable 234, to a connector adaptor 228 on an integrated hardware enclosure 212 of the adjustable optical tap 210. Likewise, a pre-connectorized output connector assembly 218 is connected to a connector adaptor 230 using a pre-connectorized output connector 238. An output distribution cable 240 continues on to additional branch points in the communications network downstream. A power adjustment device 226, such as a knob, screw, button or the like, is also included on the enclosure 212, which in this example is That which is claimed is:

1. An adjustable optical tap for adjusting input power, output power, and drop power in a communications network, the adjustable optical tap comprising:
   an enclosure having a plurality of connector assemblies being configured for interconnecting input and output cables;
   a cover attachable to the enclosure, the cover including a plurality of drop cable ports;
   a tunable splitter disposed in the enclosure in communication with the input cable and the drop cable ports, the tunable splitter being configured for an in-the-field adjustment to affect attenuation in a broad wavelength band; and
   an adjustment device connected to the enclosure and configured to adjust the tunable splitter by changing a propagation constant of a fiber contained within the enclosure.

2. The adjustable optical tap as in claim 1, wherein the connector assemblies include at least two pre-connectorized assemblies being configured respectively for connections of the input cable and the output cable.

3. An adjustable optical tap for adjusting input power, output power, and drop power in a communications network, the adjustable optical tap comprising:
   an enclosure having a plurality of connector assemblies being configured for interconnecting input and output cables;
   a cover attachable to the enclosure, the cover including a plurality of drop cable ports; and
   a tunable splitter disposed in the enclosure in communication with the input cable and the drop cable ports, the tunable splitter being configured for an in-the-field adjustment to affect attenuation in a broad wavelength band,
   wherein the cover is a first cover interchangeable with a second cover, and
   wherein the second cover has a different number of drop cable ports than the first cover.

4. The adjustable optical tap as in claim 1, wherein the broad wavelength band is between about 40 nm to at least about 300 nm.

5. An adjustable optical tap for adjusting input power, output power, and drop power in a communications network, the adjustable optical tap comprising:
   an enclosure having a plurality of connector assemblies being configured for interconnecting input and output cables;
   a cover attachable to the enclosure, the cover including a plurality of drop cable ports;
   a tunable splitter disposed in the enclosure in communication with the input cable and the drop cable ports, the tunable splitter being configured for an in-the-field adjustment to affect attenuation in a broad wavelength band; and
   a fixed splitter interposed between the tunable splitter and the drop cable ports.

6. An adjustable optical tap for adjusting input power, output power, and drop power in a communications network, the adjustable optical tap comprising:
   an enclosure having a plurality of connector assemblies being configured for interconnecting input and output cables;
   a cover attachable to the enclosure, the cover including a plurality of drop cable ports;
   a tunable splitter disposed in the enclosure in communication with the input cable and the drop cable ports, the tunable splitter being configured for an in-the-field adjustment to affect attenuation in a broad wavelength band; and
   an adjustment device connected to the enclosure, the adjustment device being configured to adjust the tunable splitter by bending a fiber contained within the enclosure.

7. The adjustable optical tap as in claim 6, wherein the cover is a first cover interchangeable with a second cover having a different quantity of drop cable ports.

8. The adjustable optical tap as in claim 7, wherein the broad wavelength band is between about 40 nm to at least about 300 nm.

9. The adjustable optical tap as in claim 6, further comprising a fixed splitter interposed between the tunable splitter and the drop cable ports.

10. A method of adjusting input power, output power and drop power using an adjustable optical tap in a communications network, the method comprising:
    installing an enclosure in a fiber optic communications network, the enclosure having an input connector assembly and an output connector assembly;
    attaching an interchangeable cover to the enclosure, the interchangeable cover including a plurality of drop cable ports;
    connecting an input cable to the input connector assembly;
    selecting a power split to affect attenuation in a broad wavelength band;
    setting the power split between the input cable and the drop cable ports in a field setting; and
    removing and replacing the interchangeable cover with a different cover, wherein the interchangeable cover and the different cover have different quantities of drop cable ports.

11. The method as in claim 10, wherein the broad wavelength band is between about 40 nm to at least about 300 nm.

12. The method as in claim 10, wherein the power split increases a loss budget by at least about 2.8 dB.

13. The method as in claim 10, further comprising connecting an output cable to the output connector assembly.

14. The method as in claim 10, further comprising setting the power split by adjusting a tunable splitter interposed between the input cable and the drop cable ports.

15. The method as in claim 14, wherein the tunable splitter is adjusted by an external adjustment device connected to the enclosure, the setting of the power split being accomplished without opening the enclosure.

16. The method as in claim 10, further comprising connecting respective drop cables to the drop cable ports.

17. The adjustable optical tap as in claim 1, wherein the propagation constant of the fiber is adjusted by bending the fiber.

18. The adjustable optical tap as in claim 1, wherein the adjustment device is accessible from an exterior of the enclosure.

19. The adjustable optical tap as in claim 6, wherein the adjustment device includes at least one of a knob, a screw, and a button.

20. The adjustable optical tap as in claim 6, wherein the adjustment device includes a screw that can be advanced to bend the fiber.

21. The method as in claim 14, wherein adjusting the tunable splitter comprises changing the propagation constant of a fiber contained within the enclosure.

* * * * *